US006608811B1

(12) United States Patent
Holden et al.

(10) Patent No.: US 6,608,811 B1
(45) Date of Patent: Aug. 19, 2003

(54) STRUCTURE WITH MAGNETIC PROPERTIES

(75) Inventors: Anthony J Holden, Brackley (GB); Michael C Wiltshire, High Wycombe (GB); David J Robbins, Towcester (GB); William J Stewart, Blakesley (GB); John B Pendry, Cobham (GB)

(73) Assignee: Marconi Caswell Limited, London (GB)

( * ) Notice: Subject to any disclaimer, the term of this patent is extended or adjusted under 35 U.S.C. 154(b) by 0 days.

(21) Appl. No.: 09/622,856

(22) PCT Filed: Dec. 23, 1999

(86) PCT No.: PCT/GB99/04419

§ 371 (c)(1), (2), (4) Date: Nov. 3, 2000

(87) PCT Pub. No.: WO00/41270

PCT Pub. Date: Jul. 13, 2000

(30) Foreign Application Priority Data

Jan. 4, 1999 (GB) ............................................ 9900034

(51) Int. Cl.$^{7}$ ................................................ H01G 4/005

(52) U.S. Cl. ................. 369/303; 361/301.2; 361/306.1; 361/321.1; 428/622; 428/626; 428/650

(58) Field of Search ........................... 361/321.1, 306.1, 361/311, 313, 301.4, 306.2, 303; 342/1, 2, 3, 4; 428/622, 626, 650

(56) References Cited

U.S. PATENT DOCUMENTS

| | | | |
|---|---|---|---|
| 4,017,865 A | | 4/1977 | Woodward |
| 4,052,710 A | * | 10/1977 | Calhoun et al. |
| 4,960,651 A | * | 10/1990 | Pettigrew et al. |
| 5,140,338 A | * | 8/1992 | Schmier et al. |
| 5,223,849 A | | 6/1993 | Kasevich et al. |
| 5,276,448 A | | 1/1994 | Naito et al. |
| 5,385,623 A | | 1/1995 | Diaz |
| 5,812,080 A | | 9/1998 | Takahashi |
| 6,057,796 A | * | 5/2000 | Kotsuka |

FOREIGN PATENT DOCUMENTS

| | | |
|---|---|---|
| EP | 0 187 437 A1 | 7/1986 |
| EP | 0 439 337 A2 | 7/1991 |
| GB | 2 227860 A | 12/1999 |
| GB | 2 339341 A | 1/2000 |
| WO | WO 88/01442 | 2/1988 |
| WO | WO 99/50929 | 10/1999 |

* cited by examiner

*Primary Examiner*—Dean A. Reichard
*Assistant Examiner*—Nguyen Ha
(74) *Attorney, Agent, or Firm*—Kirschstein, et al.

(57) ABSTRACT

A structure which exhibits magnetic properties when it receives electromagnetic radiation is formed from an array of capacitive elements each of which is smaller, and preferably much smaller, than the wavelength of the radiation. Each capacitive element has a low resistance conducting path associated with it and is such that a magnetic component of the received electromagnetic radiation induces an electrical current to flow around the path and through the associated element. The creation of internal magnetic fields generated by the flow of the induced electrical current gives rise to the structure's magnetic properties.

14 Claims, 7 Drawing Sheets

STRUCTURE WITH MAGNETIC PROPERTIES

BACKGROUND OF THE INVENTION

This invention relates to a structure with magnetic properties. In certain applications it would be advantageous if the magnetic permeability of a material could be tailored for that application at least within a specified frequency range. Such a material could have advantages in the design of materials for electromagnetic screening for example.

SUMMARY OF THE INVENTION

The invention seeks to provide a structure having a magnetic permeability which is a function of the structure itself even though the constituent parts of the structure do not necessarily of themselves have magnetic properties.

According to the present invention a structure with magnetic properties comprises: an array of capacitive elements, wherein each capacitive element includes a low resistance conducting path and is such that a magnetic component of electromagnetic radiation lying within a predetermined frequency band induces an electrical current to flow around said path and through said associated element and wherein the size of the elements and their spacing apart are selected such as to provide a predetermined permeability in response to said received electromagnetic radiation.

Thus, the present invention provides an artificially structured magnetic material having a permeability, the magnitude and frequency dependence of which can be tailored by appropriate design of the material structure. In the context of this patent, and for the avoidance of doubt, "capacitive" is to be construed as meaning that the electrical impedance is primarily reactive as opposed to resistive and its reactance is such that the induced electrical current leads the voltage.

Natural materials generally exhibit a magnetic permeability $\mu$ of approximately unity at microwave frequencies, but the magnetic structure of the present invention can provide values of $\mu$ typically in the range −1 to 5 at frequencies in the GHz region, or wider depending on bandwidth.

An important feature of the artificially structured magnetic material of the present invention is the capacitive elements which enable the creation of internal fields that are inhomogeneous, that is on a scale smaller than the wavelength of incoming radiation, and preferably far smaller. These capacitive elements act through the relations $$B_{av}=\mu_{eff}\mu_0 H_{av} \qquad \text{Eq. 1}$$

$$D_{av}=\in_{eff}\in_0 E_{av} \qquad \text{Eq. 2}$$

on the average fields to provide effective values for $\mu_{eff}$ and $\in_{eff}$ which are quite different to those which would be obtained either from the constitutive elements themselves or would be obtained from a simple volume average of material properties. A large variation in the magnetic permeability can be produced by large inhomogeneous electric fields, via a large self capacitance of the array of capacitive elements. The magnetic properties of a structured material in accordance with the invention arises not from any magnetism of its constituent components, but rather from the self capacitance of the elements which interact with the electromagnetic radiation to generate large inhomogeneous electric fields within the structure.

The dimensions of each capacitive element are preferably at least an order of magnitude less than the wavelength of the radiation which it is designed to receive.

Advantageously each capacitive element is of a substantially circular section and in one embodiment comprises two or more concentric conductive cylinders in which each cylinder has a gap running along its length. Each cylinder may be continuous along its length, or can comprise a plurality of stacked planar sections, preferably in the form of split rings, each of which is electrically insulated from adjacent sections. The latter is particularly suited to being fabricated readily using, for example, printed circuit board (PCB) fabrication techniques. Alternatively each element can be in the form of a conductive sheet wound as a spiral. In one embodiment successive turns of the spiral are progressively displaced along the axis of the spiral to form a helical structure, with adjacent turns partially overlapping. Such an arrangement is found to exhibit significant circular bi-refringence. In yet a further embodiment each capacitive element comprises a plurality of stacked planar sections each of which is electrically isolated from each other and is the form of a spiral. Again such a structure can be fabricated readily using PCB manufacturing techniques.

The array can contain elements which are all arranged with their axis in a single direction, e.g. normal to the plane of the array; alternatively the array can contain elements with axis pointing in two or three mutually orthogonal directions. The array can include multiple layers of capacitive elements. The capacitive elements can also take the form of interlocking rings which are electrically insulated or isolated from each other, with each ring having means, eg a gap in it, to prevent circulation of dc currents.

In yet a further embodiment the structure further incorporates a switchable permittivity material enabling the magnetic permeability of the structure to be switched externally by, for example, the application of an external electric field. Advantageously the switchable permittivity material is a ferroelectric material such as barium strontium titanate (BST). The concept of including a switchable permittivity material into such a structure to enable its magnetic properties to be controlled externally is considered to be inventive in its own right.

BRIEF DESCRIPTION OF THE DRAWINGS

The invention will now be described by way of example with reference to the accompanying drawings, in which:

FIG. 1(*b*) is an enlarged representation of a capacitive element of the structure of FIG. 1(*a*);

DETAILED DESCRIPTION OF THE PREFERRED EMBODIMENTS

Figure 1A:
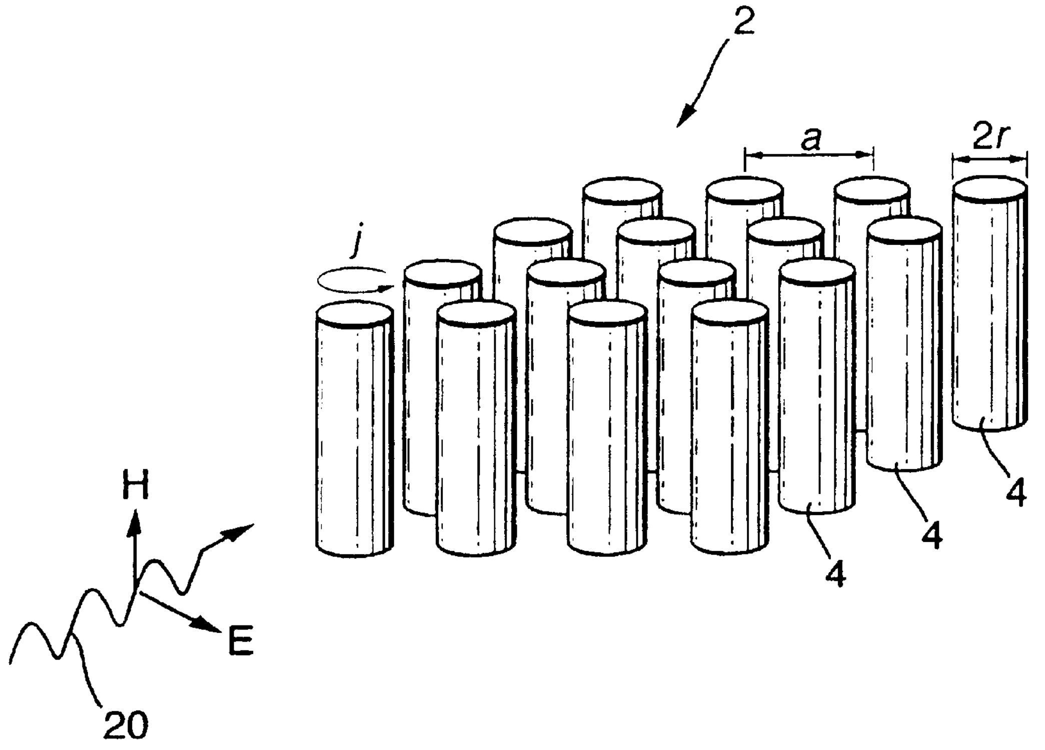
FIG. 1(*a*) is a schematic representation of a structured magnetic material in accordance with a first embodiment of the invention.
Figure 1B:
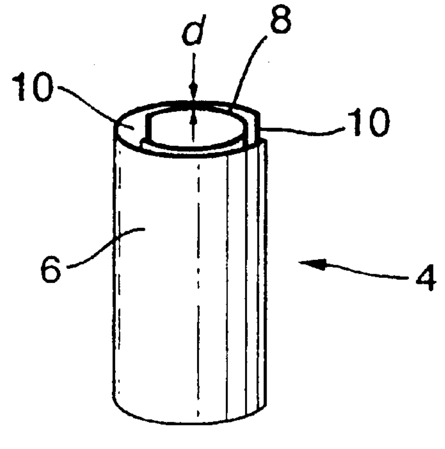

Referring to FIGS. 1(*a*) and 1(*b*), there is shown a structured magnetic material 2 in accordance with the invention which comprises an array of capacitive elements 4, each of which consists of two concentric metallic electrically conducting cylindrical tubes: an outer metallic conductive cylindrical tube 6 and an inner metallic conductive cylindrical tube 8. Both cylindrical tubes 6, 8 have a longitudinal (i.e. in an axial direction) gap 10 and the two gaps 10 are offset from each other, preferably by 180°. The elements 4 are arranged in a regular array positioned on centres a distance a apart. The outer cylindrical tube 6 has a radius r, and the inner and outer cylindrical tubes 4, 6 are separated by a distance d.

It is important to note that the gap 10 prevents dc electrical current from flowing around either of the cylindrical tubes 6, 8. There is however, a considerable self capacitance between the two cylindrical tubes 6, 8 which enables ac current to flow.

Figure 2:
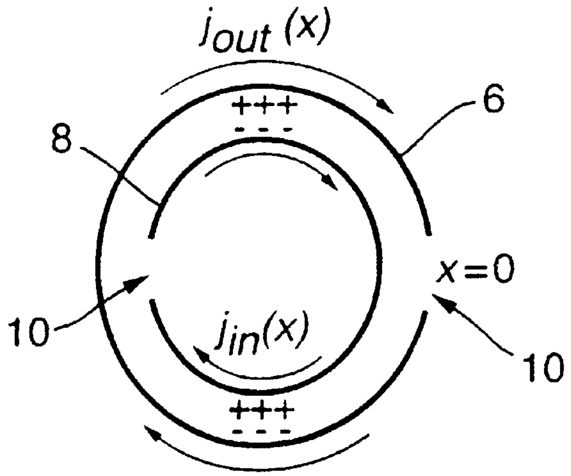
FIG. 2 is a plan view of the capacitive element of FIG. 1(*b*) indicating the direction of electrical current flow.

When the structured material 2 is subjected to electromagnetic radiation 20 whose magnetic field H is parallel to the axis of the cylindrical tubes 6, 8 this induces alternating electrical currents in the sheets of the tubes as shown in FIG. 2. In FIG. 2 the direction of the electrical current is denoted by j which is the induced current density. The greater the capacitance between the sheets 6, 8 of a capacitive element, the greater the induced current density j.

Using standard analysis based on Maxwell's equations to describe the electromagnetic fields, it can be shown that a structured material (medium) comprising an array of such capacitive elements has an effective magnetic permeability $\mu_{eff}$ which is given by:

$$\mu_{eff}(\omega) = 1 - \left( \frac{\frac{\pi r^2}{a^2}}{1 + \frac{2\sigma i}{\omega r \mu_0} - \frac{3dc_0^2}{\pi^2 \omega^2 r^3}} \right) \qquad \text{Eq. 3}$$

in which σ is the resistivity of the cylindrical tubes 6, 8, ω is the angular frequency, i is $\sqrt{-1}$, r is the radius of the outer cylindrical tube 6, $c_0$ the velocity of light, a the unit cell edge length and d the separation between the tubes 6, 8.

Furthermore, it can be shown that such a structured material has a magnetic permeability that has a resonant variation which diverges at an angular resonant frequency $\omega_0$ which is given by:

$$\omega_0 = \sqrt{\frac{3dc_0^2}{\pi^2 r^3}} \qquad \text{Eq. 4}$$

At a certain angular frequency $\omega_p$, which by analogy with conventional models of the dielectric response of materials we will refer to as a magnetic "plasma frequency", the effective magnetic permeability $\mu_{eff}$ is equal to zero. At the magnetic plasma frequency $\omega_p$ the system sustains longitudinal magnetic modes that are the analogue to the plasma modes in a free electron gas. The currents flowing around the cylindrical tubes make the tubes ends take on the role of magnetic poles. For the array of split cylindrical tubes illustrated in FIGS. 1(*a*) and 1(*b*) the magnetic plasma frequency is given by:

$$\omega_p = \sqrt{\frac{3dc_0^2}{\pi^2 r^3 \left(1 - \frac{\pi r^2}{a^2}\right)}} \qquad \text{Eq. 5}$$

Figure 3:
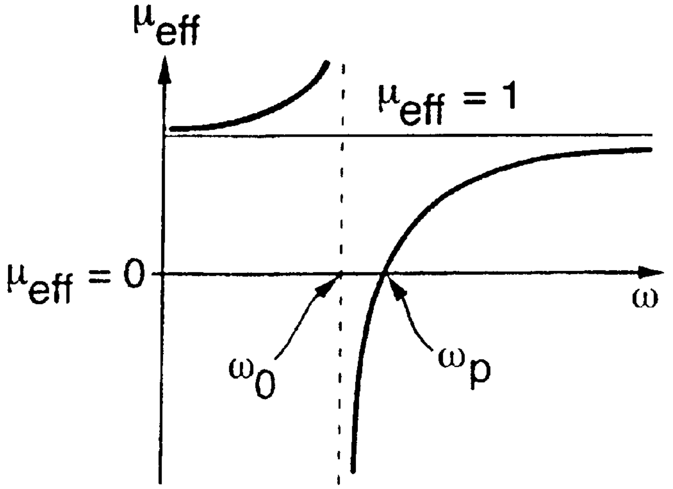
FIG. 3 is a plot of the effective magnetic permeability as a function of angular frequency for the structured material of FIG. 1(*a*)

FIG. 3 illustrates the typical form of the effective magnetic permeability μeff as a function of angular frequency ω for capacitive elements which are highly conducting, that is, σ=0, showing the resonant variation. As can be seen from in FIG. 3, below the resonant frequency $\omega_0$ the effective magnetic permeability $\mu_{eff}$ is enhanced. Above resonance $\omega_{eff}$ is less than unity and can be negative close to the resonance. For example for a structured magnetic material in which, r=2 mm, a=5 mm and d=100 μm, the magnetic plasma frequency $f_p=\omega_p/2\pi$ is approximately 3 GHz for the case of σ=0. The frequency separation between the resonant $\omega_0$ and plasma $\omega_p$ frequencies is a measure of the range of frequencies over which the effective magnetic permeability is strongly varying and as will be apparent from equation 6 below depends upon the fraction of the structure external to the cylindrical tubes.

$$\omega_p = \frac{\omega_0}{\sqrt{\frac{1 - \pi r^2}{a^2}}} \qquad \text{Eq. 6}$$

The ratio of the area of the tubes ($\pi r^2$) to the area of a unit cell ($a^2$) is an important parameter in determining the strength of the effect on the effective magnetic permeability in all of the structures discussed in this patent.

Figure 4:
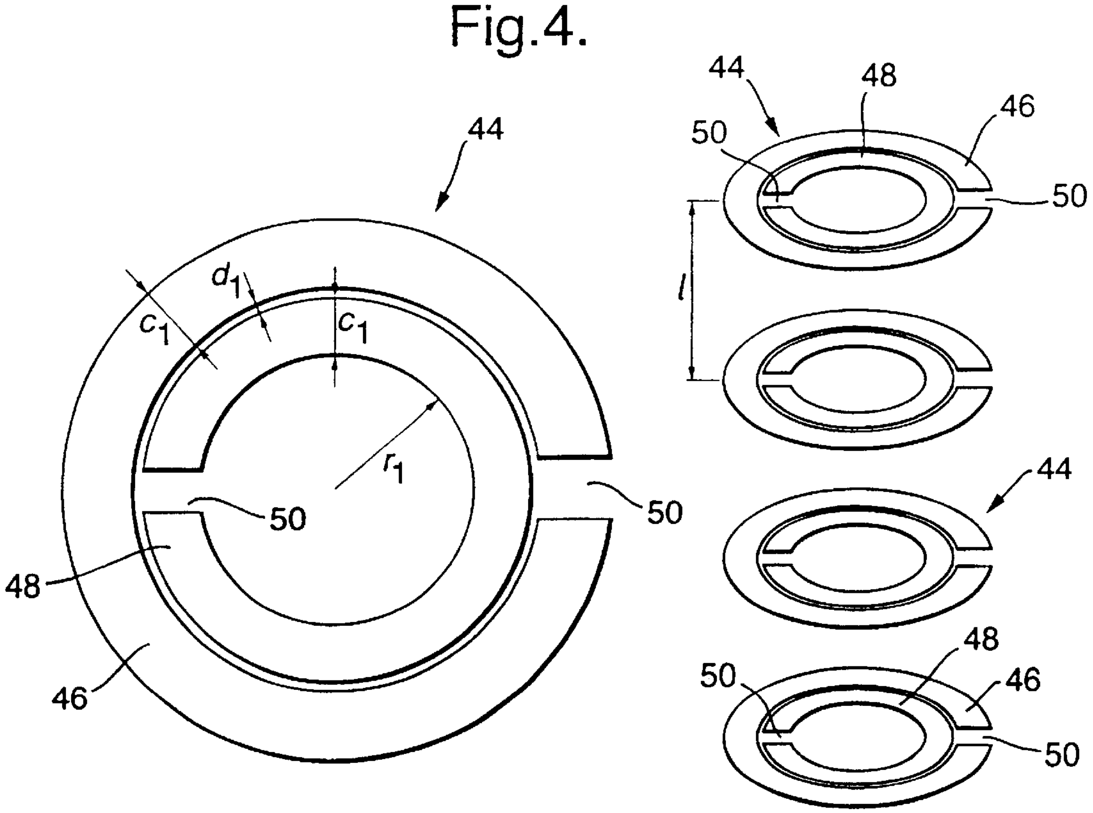
FIG. 4 is a representation of a capacitive element in accordance with a second embodiment of the invention.
Figure 5:
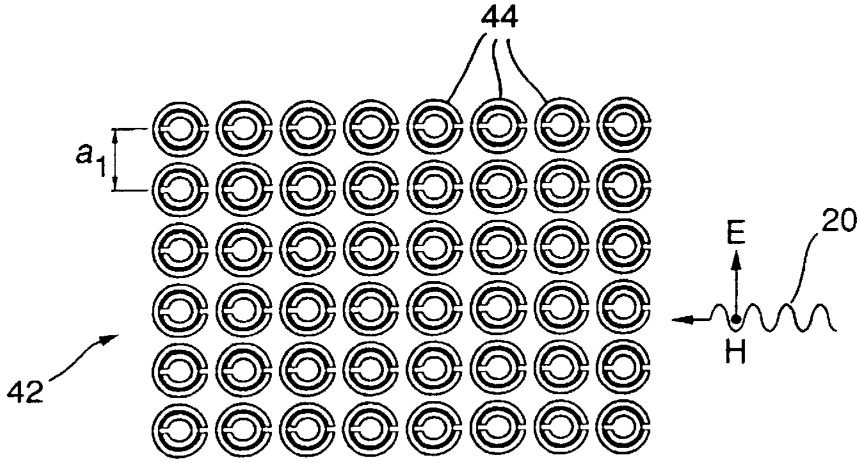
FIG. 5 is a representation of a structured magnetic material in accordance with a second embodiment of the invention which incorporates the capacitive element of FIG. 4.

Referring to FIG. 4, this shows an alterative form of capacitive element 44, in which the split cylindrical tubes are composed of circular structures which are built up in sheets, and so are not continuous along the longitudinal axis as is the case in FIG. 1. Each element 44 consists of a number of outer split rings 46, and inner split rings 48, each ring being composed of an electrically conducting material formed and patterned on an insulating sheet. Each split ring 46, 48 has a gap 50 positioned so that the gap 50 in the inner ring 48 is offset from that in the outer ring 46, preferably by 180°. The relevant dimensions $c_1$, $d_1$ and $r_1$ are as shown on the enlarged drawing in FIG. 4 in which $c_1$ is the width of each ring 46, 48 in a radial direction, $d_1$ is the spacing between concentric rings and $r_1$ is the inner radius of the inner ring 48. A structured magnetic material 42 comprising a large regular array of elements 44 is formed as shown in FIG. 5, in which the centre spacing of adjacent elements in rows and columns is $a_1$.

With the H-field of the electromagnetic radiation 20 orientated along the cylinder axis, the effective magnetic permeability of the structured material 42 can again be obtained from Maxwell's equations and is given by:

$$\mu_{eff}(\omega)=1-\frac{\frac{\pi r_1^2}{a_1^2}}{1+\frac{2\sigma i}{\omega r_1\mu_0}-\frac{3}{\pi^2\mu_0\omega^2Cr_1^3}}\qquad\text{Eq. 7}$$

where C is the capacitance per unit length in an axial direction for a column of rings 44. The resistivity a of the conductive rings is given by $\sigma=\sigma_1 N_1^{-1}$, where $\sigma_1$ is the resistance of a unit length of one of the conductor making up the ring and $N_1$ is the number of split rings per unit length stacked in the z-direction (axial).

The usefulness of a material composed of this structure can be illustrated analytically via an approximation to the capacitance per unit length C obtained under the assumptions that the two rings 46, 48 are of equal radial width $c_1$, $r_1>>c_1$, $r_1>>d_1$, $l<r_1$, where l is the separation between the rings in a given column and $$\ln\frac{c_1}{d_1}>>\pi$$

where ln is the natural logarithm, that is the logarithm to base e.

$$C=\frac{\varepsilon_0}{\pi}\ln\left(\frac{2c_1}{d_1}\right)\qquad\text{Eq. 8}$$

Substituting this into Equation 7 the effective magnetic permeability $\mu_{eff}$ is then given by:

$$\mu_{eff}(\omega)=1-\frac{\frac{\pi r_1^2}{a_1^2}}{1+\frac{2l\sigma_1}{\omega r_1\mu_0}i-\frac{3lc_0^2}{\pi\omega^2 r_1^3\ln\left[\frac{2c_1}{d_1}\right]}}\qquad\text{Eq. 9}$$

and the resonant angular frequency $\omega_0$ given by:

$$\omega_0^2=\frac{3lc_0^2}{\pi r_1^3\ln\left[\frac{2c_1}{d_1}\right]}\qquad\text{Eq. 10}$$

As can be seen from Equation 10 the resonant frequency $\omega_0$ scales uniformly with size: if the size of all elements in a given structure is doubled, the resonant frequency halves. Nearly all the critical magnetic properties of the structure are determined by this resonant frequency, which can be brought into the microwave region by choosing an appropriate set of parameters. For example for a structure in which: $a_1$=10 mm, $c_1$=1 mm, $d_1$=0.1 mm, l=2 mm, $r_1$=2mm. The resonant frequency is $$f_0'=\frac{\omega_0}{2\pi}=1.35\text{ GHz.}$$

A structured material having these typical dimensions can be fabricated using standard techniques used in PCB manufacture. The resistivity of typical metals used e.g. copper, has a negligible effect on the magnetic permeability variation obtained.

Figure 6:
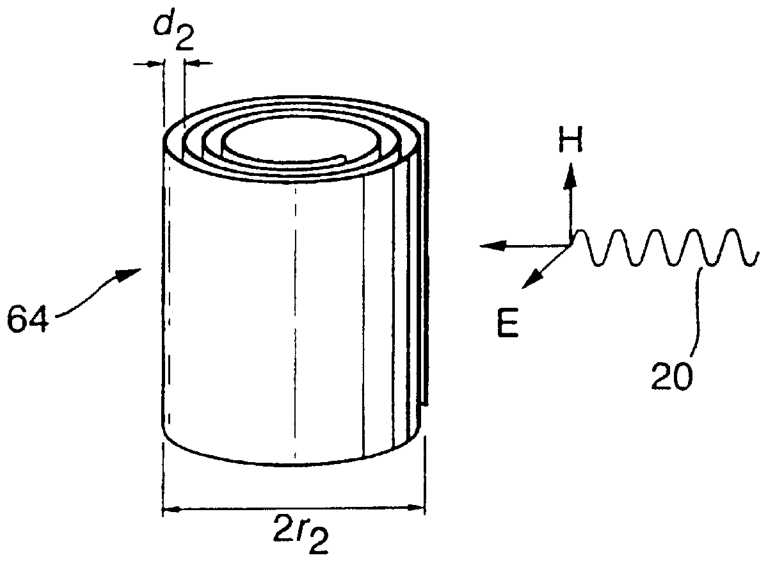
FIG. 6 is a representation of a further form of capacitive element in accordance with a third embodiment of the invention.

Referring to FIG. 6 there is shown a further form of capacitive element 64 which takes the shape of a conductive sheet which is rolled into a spiral, so as to resemble a "Swiss Roll". It is rolled into an $N_2$ turn spiral of radius $r_2$, with each layer of the roll sheet spaced by a distance $d_2$ from the previous one. When a structured material composed of an array of such elements is subjected to electromagnetic radiation 20, in which the magnetic field H is parallel to the axis of the "Swiss Roll", this induces alternating currents in the sheet of the roll. The important point is again that no dc current can flow around the capacitive element. The only current flow that is permitted is by virtue of the self capacitance between the first and last turns of the spiral.

The effective magnetic permeability for a material composed of an array of such capacitive elements is given by:

$$\mu_{eff}(\omega)=1-\frac{\frac{\pi r_2^2}{a_2^2}}{1+\frac{2\sigma i}{\omega r_2\mu_0(N_2-1)}-\frac{d_2c_0^2}{2\pi^2r_2^3(N_2-1)\omega^2}}\qquad\text{Eq. 11}$$

Whilst the expressions for $\omega_0$ and $\omega_p$ then become $$\omega_0=\sqrt{\frac{d_2c_0^2}{2\pi^2r_2^3(N_2-1)}}\quad\text{and}\qquad\text{Eq. 12}$$

$$\omega_p=\sqrt{\frac{d_2c_0^2}{2\pi^2r_2^3(N_2-1)\left(1-\frac{\pi r_2^2}{a_2^2}\right)}}\qquad\text{Eq. 13}$$

For example for a structured material in which $r_2$=0.2 mm, $a_2$=0.5 mm, $d_2$=10 $\mu$m, and $N_2$=3, the above frequencies are $f_0=\omega_0/2\pi$=8.5 GHz and $$f_p=\omega_p/2\pi=12.05\text{ GHz.}$$

Figure 7:
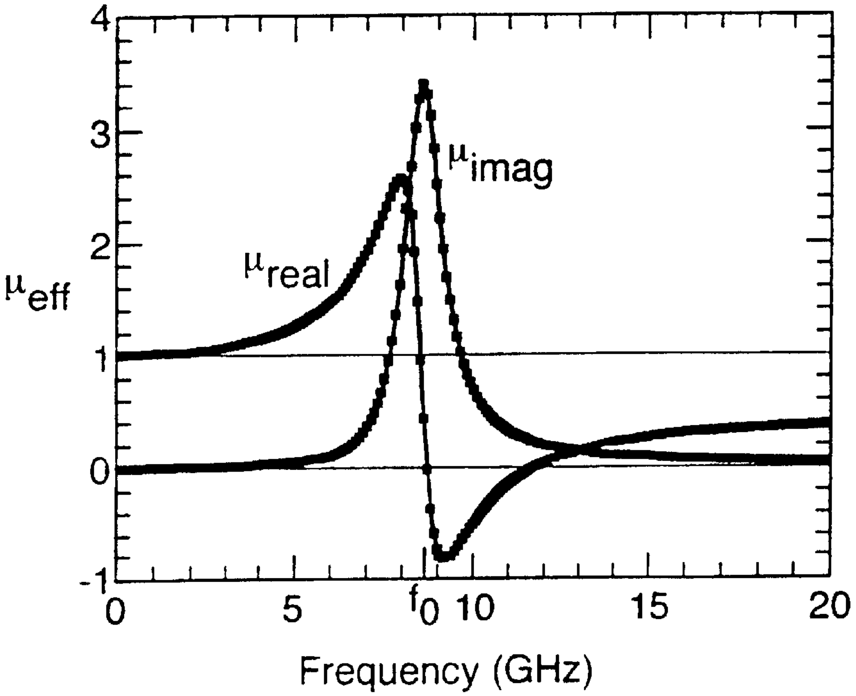
FIG. 7 is a plot of effective magnetic permeability versus frequency for a structured magnetic material incorporating an array of the capacitive elements of FIG. 6.

Using these parameters the dispersion of the magnetic permeability is plotted in FIG. 7 for a resistivity of $\sigma=2\Omega$. The resonant frequency $f_0$ in these structures can readily be scaled by scaling $r_2$.

Figure 8:
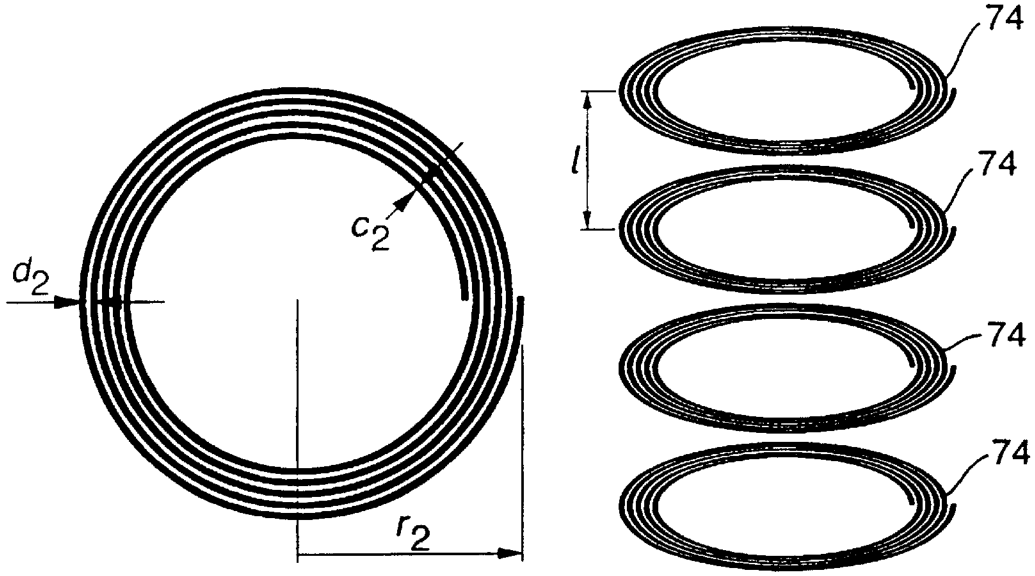
FIG. 8 is a representation of a capacitive element in accordance with a fourth embodiment of the invention.
Figure 9:
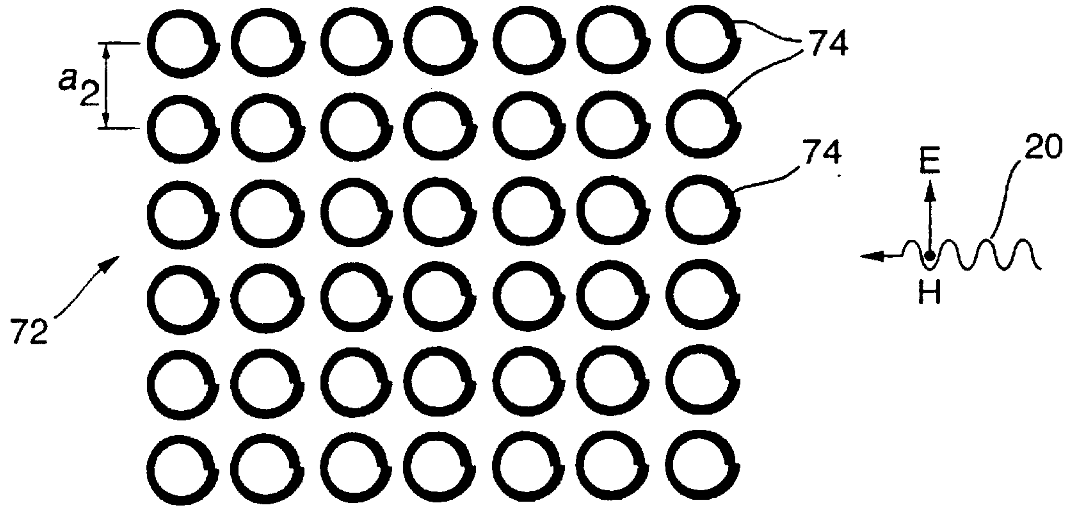
FIG. 9 is a representation of a structured magnetic material in accordance with a fourth embodiment of the invention which incorporates the capacitive element of FIG. 8.

By analogy with the split cylindrical tubes 4 being equivalent to a plurality of stacked planar rings 46, 48 it can be shown that the capacitive elements in the form of a spiral 64 can be formed as a plurality of stacked planar sections 74, each of which is electrically isolated from adjacent sections and in which each section is formed as a electrically conducting spiral, as illustrated in FIGS. 8 and 9. It can be shown that the effective magnetic permeability of a structure comprising an array of such elements, as shown in FIG. 9, is given by:

$$\mu_{eff}(\omega)=1-\frac{\frac{\pi r_2^2}{a_2^2}}{1+\frac{2\sigma i}{\omega r_2\mu_0(N_2-1)}-\frac{lc_0^2}{2\pi r_2^3\varepsilon(N_2-1)\omega^2\ln\left[\frac{2c_2}{d_2}\right]}}\qquad\text{Eq. 14}$$

in which $d_2$ is the separation between concentric turns of the spiral, $r_2$ is the radius of the spiral, l is the separation between the spiral sections in a vertical direction as illustrated, $N_2$ is the number of turns within each spiral, $c_2$ the width of each turn of the spiral in a radial direction, $a_2$ the unit cell dimension of the array, and $\in$ is the permittivity of the insulating material upon which the conducting spiral is formed. As illustrated in FIG. 9, the structured material 72 can comprise a square array of such capacitive elements 74 but in alternative arrangements the structure can be formed using other forms of arrays such as hexagonal close-packed. The arrangement of FIGS. 8 and 9 is found to be advantageous since it lends itself to being fabricated readily using, for example, PCB manufacturing techniques.

Using capacitive cylindrical elements, such as the helix or "Swiss Roll", the magnetic permeability can be adjusted typically by a factor of two and, in addition if desired, an imaginary component of the order of unity can be introduced. The latter implies that an electromagnetic wave moving in such a material would decay to half its intensity within a single wavelength. This presumes that broad-band effects that persist over the greater part of the 2–20 GHz region are of interest. If however an effect over a narrow range of frequencies is sufficient spectacular enhancements of the effective magnetic permeability can be achieved, limited only by the resistivity of the sheets and by how narrow a band is tolerable. For example at frequencies of a few tens of megahertz the permeability can be enhanced within a range −20 to +50.

Figure 10:
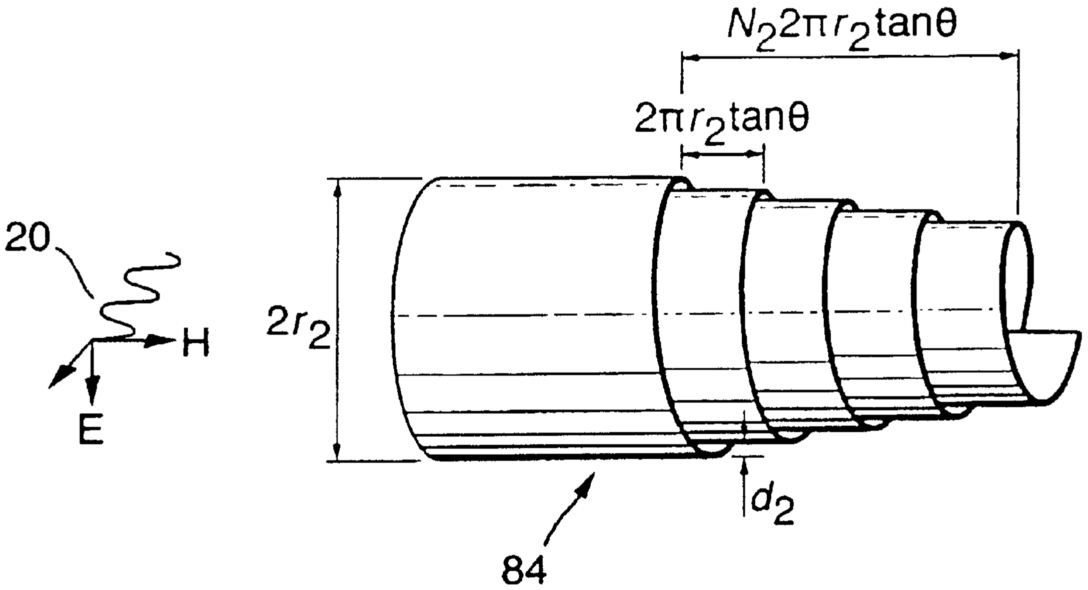
FIG. 10 is a schematic representation of a capacitive element in accordance with a fifth embodiment of the invention.
Figure 11:
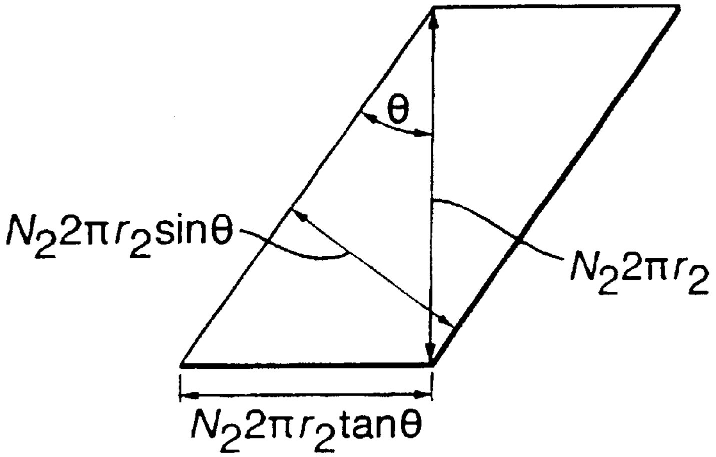
FIG. 11 shows the capacitive element of FIG. 10 in an unwound state.

The "Swiss Roll" capacitive element can also form the basis of a structured material exhibiting significant circular bi-refringence. This can be achieved by winding the cylindrical capacitive elements of the Swiss Roll in a helical fashion. Each layer of foil is separated from the next by a distance $d_2$, and the total thickness of foil is $N_2$ layers as shown in FIG. 10. FIG. 11 shows the geometry of the sheet of foil used to make one such capacitive element 84 in an unwound state. The capacitive element 84 shown in FIG. 10 is a right handed spiral. As will be appreciated by those skilled in the art the opposite bi-refringence effect can be obtained with a left handed spiral. The structured magnetic material is composed of an array of such capacitive elements 84, similar to that shown in FIG. 1.

Figure 12:
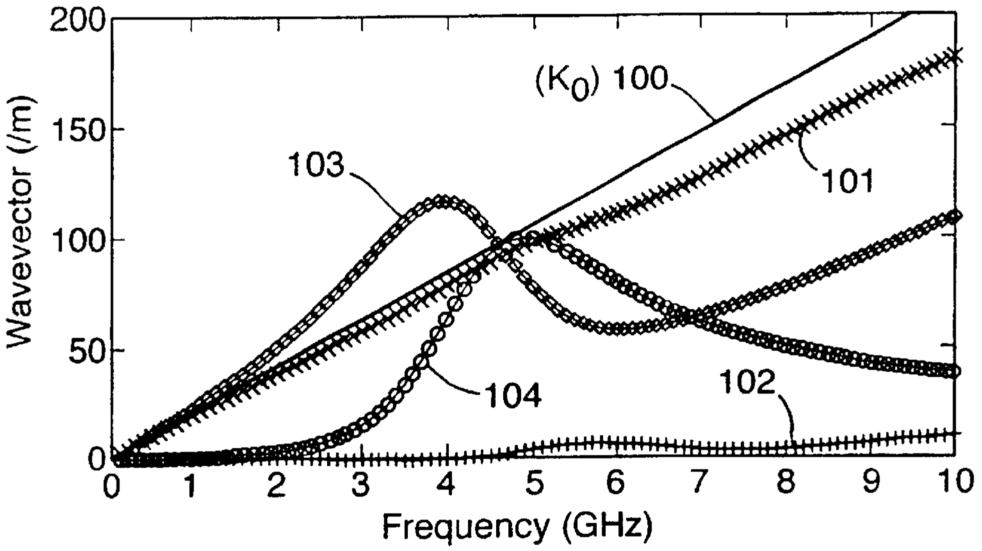
FIG. 12 is a plot of wavevector versus frequency for a structured magnetic material incorporating the capacitive element of FIG. 10.

As an illustrative example, FIG. 12 shows the wave-vector, as a function of frequency calculated for a six layer helical "Swiss-Roll" structure, i.e. $N_2=6$, where $a_2=500\ \mu m$, $r_2=200\ \mu m$ and $d_2=10\ \mu m$ and the pitch θ of the helix is 2°. Some resistive loss (σ=10Ω) is assumed. In the absence of loss the two polarization are different only in the real parts of their propagation constants, which is less interesting since it chiefly affects the phase of the transmission. In the lossy case, FIG. 12, it is clear that the two circular polarizations (denoted (k+) and (k−)) propagate quite differently; there being a substantial loss in (k−) sufficient to differentiate between the two polarization within a wavelength or so. In FIG. 12, $k_0$ is shown by line 100, the real part of k+ by line 101, the imaginary part of k+ by line 102, the real part of k− by line 103 and the imaginary part of k− by line 104. From FIG. 12, it can be deduced that there is free photon behavior at low frequencies but the loss now enables one to differentiate between polarization in terms of their decay rate from about 3 GHz upwards.

The number of turns, $N_2$, is an important parameter of the structure. The effect of increasing $N_2$ is to lower the active frequency, that is the position of the peak in the imaginary part of k− (line 104 in FIG. 12), to reduce the difference in dispersion for the two polarizations. Since the pitch of the helix, θ, controls how densely wound the helical roll is, large values of θ also tend to reduce the effect.

It is also envisaged to incorporate switchable permittivity materials in the structured magnetic materials described to provide new functionality such as for example a magnetic structured material whose resonant frequency can be controlled externally. Non-linear dielectric materials can exploit the strong E-fields which are concentrated into the very small volume within the capacitive elements or magnetic microstructures. Suitable materials would be ferroelectric ceramics or liquid crystals which can be incorporated for example between the cylindrical tubes of a given element (FIG. 1(*b*)), between the rings in a radial direction (FIG. 4) or between the turns of the spiral of the "Swiss Roll" elements (FIG. 6). Typically in liquid crystals a change in permittivity Δ∈ of approximately unity can be obtained against a background value of ∈~3. In a ferroelectric material such as BST (barium strontium titanate) a change from ∈~1300 in zero field conditions to ∈~700 for electric fields of ~1.5 V/μm has been measured. Other types of BST, especially thin films can display lower values of ∈. The permittivity of the non-linear material, eg the ferroelectric material, can be switched either by an incoming electromagnetic wave, or by a dc electrical field applied directly to the material.

It will be appreciated that since the magnetism of all the magnetic structured materials described arises from the highly inhomogeneous electric fields between the layers and/or turns of the capacitive elements, the magnetic permeability can be strongly affected by including a non-linear dielectric medium in the structure. A ferroelectric material such as BST, whose permittivity is non-linear, appears at first sight an ideal candidate. However, the inclusion of high permittivity materials such as BST into the structure increases the capacitance and reduces the resonance frequency $\omega_0$. In the case of a structured magnetic material composed of capacitive elements in the form of concentric cylindrical tubes in which a dielectric material is disposed between the tubes, the resonant frequency $\omega_0$ is given by:

$$\omega_0 = \sqrt{\frac{3dc_0^2}{\varepsilon\pi^2 r^3}} \qquad \text{Eq. 15}$$

It can be seen from this equation that the resonant frequency will be reduced by a factor of more than thirty through the inclusion of the dielectric material such as BST. To compensate for this effect it is desirable to reduce the overlap of the cylinders as well as the amount of BST material used. To increase the resonant frequency $\omega_0$ to a given value would require the self capacitance of each capacitive element to be reduced by the same factor. Where it is intended that the structured magnetic material is to operate at microwave frequencies this would require a structure composed of capacitive elements which were impracticable readily to fabricate.

Figure 13:
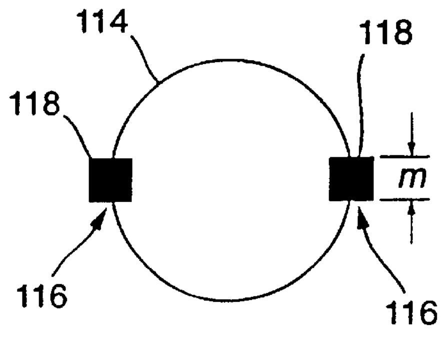
FIG. 13 is a schematic representation of a capacitive element in accordance with a vet further embodiment of the invention.
Figure 14:
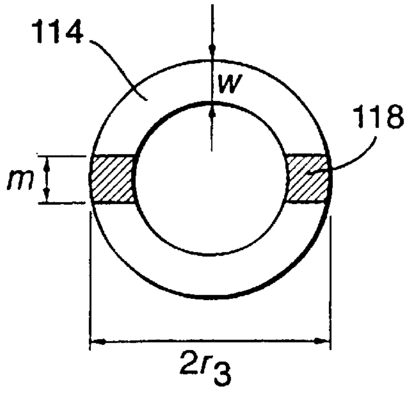
FIG. 14 is a schematic representation of an equivalent capacitive element to that of FIG. 13.

To overcome this problem a suitable capacitive element 114 shown in FIG. 13 which comprises a single cylindrical tube 114 of radius $r_3$ which has two gaps 116 running in an axial direction. A ferroelectric 118 is positioned in the gaps 116 in the cylindrical pipe 114. It can be shown that the capacitive element 114 is equivalent to a stack of single split-rings of radial width w having two gaps with ferroelectric material of permittivity ∈ in the gap of circumferential length m, as illustrated in FIG. 14. It can then be calculated that this element has a resonant frequency $\omega_0$ given by:

$$\omega_0 = \sqrt{\frac{2mc_0^2}{\varepsilon w\pi^2 r_3^3}} \qquad \text{Eq. 16}$$

In this example, the ring radius is $r_3=2$ mm, thickness $w=10\ \mu m$, and the lattice spacing between elements in the array a=5 mm giving a resonant frequency of between 5 and 7 GHz for a ferroelectric in which ∈ is in the range of 700 to 1400.

By tuning the permittivity of the ferroelectric therefore from 1400–700 using a static electric field, the resonance in the overall magnetic permeability can be shifted by nearly 50% in frequency. One method of fabricating the capacitive element of FIG. 13 is to metallise the curved surface of an insulating core, to define two gaps by forming grooves through the metallic layer by, for example, by etching or cutting and to then deposit BST in the grooves by ion beam sputtering.

Active bi-refrigent artificially structured magnetic materials can also be fabricated by using a ferroelectric or alternative material with nonlinear permittivity within a helical structure such as the Swiss Roll helix of FIG. 10.

It will be appreciated that structured magnetic materials in accordance with the invention are not restricted to the specific embodiments described and that modifications can be made which are within the scope of the invention. For example, two dimensional and three dimensional embodiments of microstructured magnetic material can be built up from the capacitive elements described by stacking, elements to generate activity along all three axes, each element being electrically isolated.

Furthermore interlocking structures can be used to improve the fill factor, ie capacitance per unit volume, and hence the activity of the material. In particular stacked ring structures could be looped through each other to achieve this.

Typical geometries of these microstructured arrays require dimensions in the range of 10's of $\mu$m to a few mm depending on the required frequency of operation. They are, therefore, amenable to a variety of fairly conventional fabrication techniques. For example: spiral or helical metallic structures could be fabricated by simple rolling of metal sheets over a rod of suitable diameter, which could be formed out of plastic. The use of dielectric formers with $\in\neq 1$ would chance the capacitance of these structures and are another way the magnetic characteristics of the material can be tailored. Metallized sheets deposited on a plastic backing would be a suitable starting material, and helices could be formed by arranging the metal coating in a bar pattern so that the angle of the helix was predetermined. The printing of resistive inks on a suitable substrate such as polyester would be another alternative and one in which the resistivity of the inks could be changed according as to the application. Split, concentric cylinders could be drawn from a structured boule. Drawing of metal and/or glass combinations can be achieved using techniques familiar from the production of optical (glass) fibres.

It will be appreciated that in all embodiments of the invention there exists an array of capacitive elements in which the dimension of said elements is substantially less than the wavelength of the radiation the structured material is intended to operate with. It will be further appreciated that the magnetic properties of the structured material of the invention arises not from any magnetism of its constituent parts, but rather from the self capacitance of the elements which interact with the magnetic component of the radiation to generate large inhomogeneous electric fields within the structure. Furthermore it will be appreciated that each capacitive element has an electrical conduction path associated with it and that said path is highly conducting i.e. it is not lossy. In contrast in the known structured materials the electrical elements are resistive and therefore lossy. The present patent application teaches a structured materials which has no static magnetic properties but which can be tailored to have a magnetic permeability that can be large, zero or even negative at a selected frequency or over a selected frequency range.

We claim:

1. A structure with magnetic properties upon receiving electromagnetic radiation, comprising: an array or capacitive elements, each capacitive element including a low resistance conducting path, and being such that a magnetic component of received electromagnetic radiation lying within a predetermined frequency band induces an electrical current to flow around the path and through the associated element, and the elements having a size and a spacing apart from one another are selected such as to provide a negative magnetic permeability over a selected frequency range in response to the received electromagnetic radiation.

2. The structure according to claim 1, in which each capacitive element is of a substantially circular section.

3. The structure according to claim 1, in which each capacitive element is in a form of a plurality of concentric conductive cylinders in which each cylinder has a gap running along a length of the respective cylinder.

4. The structure according to claim 3, in which each cylinder comprises a plurality of stacked planar sections, each of which is electrically insulated from adjacent sections.

5. The structure according to claim 1, in which each capacitive element is in a form of a conductive sheet wound as a spiral.

6. The structure according to claim 5, in which successive turns of the spiral are progressively displaced along an axis of the spiral to form a helical structure with adjacent turns partially overlapping.

7. The structure according to claim 1, in which each capacitive element comprises a plurality of stacked planar sections, each of which is electrically isolated from each other and is a form of a spiral.

8. The structure according to claim 1, in which the capacitive elements have axes pointing in a common direction.

9. The structure according to claim 1, in which the capacitive elements are arranged in groups having axes pointing in a plurality of mutually orthogonal directions.

10. The structure according to claim 1, wherein the capacitive elements lie in a plurality of planes to form a multilayer structure.

11. The structure according to claim 1, and further comprising a switchable permittivity material within the structure.

12. The structure according to claim 11, in which the switchable permittivity material is a ferroelectric material.

13. The structure according to claim 1, in which a dimension of the capacitive elements is substantially less than a wavelength of the received electromagnetic radiation.

14. The structure according to claim 13, in which the dimension of each of the capacitive elements is at least an order of magnitude less than the wavelength of the received electromagnetic radiation.

* * * * *